United States Patent
Warichet et al.

(10) Patent No.: US 10,801,096 B2
(45) Date of Patent: Oct. 13, 2020

(54) CONTINUOUS SINGLE-DIP PROCESS FOR GALVANIZATION OF STEEL LONG PRODUCTS INTO ZN—AL—MG ALLOYS

(71) Applicant: Fontaine Holdings NV, Houthalen (BE)

(72) Inventors: David Warichet, Wezembeek-Oppem (BE); Julien Balduyck, Bande (BE); Caroline Masquelier, Marcq (BE)

(73) Assignee: FONTAINE HOLDINGS NV, Houthalen (BE)

( * ) Notice: Subject to any disclaimer, the term of this patent is extended or adjusted under 35 U.S.C. 154(b) by 0 days.

(21) Appl. No.: 14/062,189

(22) Filed: Oct. 24, 2013

(65) Prior Publication Data

US 2014/0120369 A1    May 1, 2014

(30) Foreign Application Priority Data

Oct. 25, 2012  (GB) .................................. 1219210.0

(51) Int. Cl.

| | |
|---|---|
| *C23C 2/36* | (2006.01) |
| *B23K 35/362* | (2006.01) |
| *C23C 2/30* | (2006.01) |
| *C23C 2/38* | (2006.01) |
| *C22C 18/04* | (2006.01) |
| *C23G 1/08* | (2006.01) |
| *C23C 2/02* | (2006.01) |
| *B23K 35/36* | (2006.01) |
| *C23C 2/06* | (2006.01) |
| *C23G 1/00* | (2006.01) |
| *B32B 15/01* | (2006.01) |

(52) U.S. Cl.
CPC .............. *C23C 2/36* (2013.01); *B23K 35/362* (2013.01); *B23K 35/3603* (2013.01); *B32B 15/013* (2013.01); *C22C 18/04* (2013.01); *C23C 2/02* (2013.01); *C23C 2/06* (2013.01); *C23C 2/30* (2013.01); *C23C 2/38* (2013.01); *C23C 2/385* (2013.01); *C23G 1/00* (2013.01); *C23G 1/08* (2013.01); *Y10T 428/12799* (2015.01)

(58) Field of Classification Search
CPC .............. B32B 15/00; B05B 5/00; C23C 2/26

USPC ........................................ 427/310, 543, 557
See application file for complete search history.

(56) References Cited

U.S. PATENT DOCUMENTS

| | | | |
|---|---|---|---|
| 3,943,270 A * | 3/1976 | Neu | C23C 2/30 427/310 |
| 4,610,936 A * | 9/1986 | Isobe | B32B 15/013 420/519 |
| 6,579,615 B1 | 6/2003 | Sugimaru et al. | |
| 6,921,439 B2 | 7/2005 | Warichet et al. | |
| 7,160,581 B2 | 1/2007 | Gilles et al. | |
| 7,560,494 B2 | 7/2009 | Steinbrenner et al. | |
| 2003/0219543 A1* | 11/2003 | Warichet | C23C 2/06 427/433 |
| 2007/0137731 A1* | 6/2007 | Leychkis | C23C 2/30 148/23 |

FOREIGN PATENT DOCUMENTS

| | | |
|---|---|---|
| CN | 101948990 | 1/2011 |
| EP | 0488423 | 6/1992 |
| EP | 1209245 | 5/2002 |
| GB | 1040958 | 9/1966 |
| JP | 58136759 | 8/1983 |
| JP | 2001/049414 | 2/2001 |
| WO | 95/04607 | 2/1995 |
| WO | 2007/146161 | 12/2007 |
| WO | 2011/009999 | 1/2011 |

OTHER PUBLICATIONS

GH Induction Atmospheres, What is Induction Heating, Nov. 22, 2011.*

* cited by examiner

*Primary Examiner* — Hai Y Zhang
(74) *Attorney, Agent, or Firm* — Duane Morris LLP; Gregory M. Lefkowitz; Jason M. Nolan

(57) ABSTRACT

By first fluxing a steel long product with novel specific flux compositions, it is possible to continuously produce, more uniform, smoother and void-free galvanized coatings on such steel long products in a single hot dip galvanization step making use of zinc-aluminum alloys or zinc-aluminum-magnesium alloys with less than 95 wt. % zinc. This is achieved by providing potassium and sodium chlorides in a KCl/NaCl weight ratio of at least 2.0 in a flux composition comprising (a) more than 40 and less than 70 weight % zinc chloride, (b) from 10 to 30 weight % ammonium chloride, (c) more than 6 and less than 30 weight % of a set of at least two alkali metal chlorides.

20 Claims, No Drawings

CONTINUOUS SINGLE-DIP PROCESS FOR GALVANIZATION OF STEEL LONG PRODUCTS INTO ZN—AL—MG ALLOYS

This application claims the benefit of British Patent Application No. 1219210.0 filed Oct. 25, 2012, the disclosure of which is incorporated by reference in its entirety.

FIELD OF THE INVENTION

The present invention relates to the field of steel metallurgy, in particular galvanization, more specifically the galvanization or zinc coating of steel long products such as, but not limited to, wires, reinforcing bars (sometimes referred in the art as "rebars"), rods, rails, bars, structural shapes, tubes and the like. In particular the present invention relates to a continuous process for the galvanization of ferrous filamentous materials such as steel wires. The present invention also relates to galvanized steel long products (e.g. wires, rods, rails, bars and tubes) being galvanized continuously with the aid of novel fluxing compositions.

BACKGROUND OF THE INVENTION

Within the framework of steel metallurgy, long products are made from semi-finished products such as blooms (cross-section usually from 125 to 400 $mm^2$) and billets (cross-section usually from 50 to 125 $mm^2$) by casting with a continuous caster or rolling at a blooming mill.

As used herein throughout this application, long products are products with one dimension (length) being at least 10 times higher than the two other dimensions (as opposed to flat products) and include bars, rods, wires (coiled or not, for making e.g. bolts and fences), structural shapes and sections, rails, pipes, and tubes, e.g. for use in civil construction, mechanical engineering, energy, transport (railway, tramway), household and furniture. Bars are long products with square, rectangular, flat, round, or polygonal cross sections. Rounds can reach a diameter of about 250 mm. They are sometimes cold-drawn or even ground to very precise dimensions for use in machine parts. A special group of rounds are the reinforcing bars. Produced in diameters from about 10 to 75 mm, they provide tensile strength to concrete sections subjected to a bending load. They normally have hot-rolled protrusions on their surface to improve bonding with concrete.

Hot-rolled wire rods are produced in diameters between about 5 and 15 mm and may be shipped in coils. Rods may be cold-drawn into wires which may be afterwards covered by a coating for corrosion protection. The use of wire is extremely wide, ranging from cords for belted tires to cables for suspension bridges.

The most common structural shapes are wide flange I-beams, H-beams, L-beams, and T-beams. Such shapes are standardized, and may include railroad rails and special rails, e.g. for cranes and heavy transfer cars or for use in mines and construction.

Tubular steel long products may be broadly grouped into welded and seamless products. Longitudinally welded tubes are normally produced up to about 500 mm in diameter and/or about 10 mm in wall thickness. Pipes produced from heavy plates are also longitudinally welded after being formed and can be from about 0.5 m to 2 m in diameter, with a wall thickness up to about 180 mm. Seamless tubes are usually subjected to more demanding service; and may be rolled in diameters ranging from 120 to 400 mm and/or in a wall thickness up to about 15 mm, although special rolling mills can often increase their diameter to 650 mm. Smaller diameter tubes, both welded and seamless, can be produced by reduction mills or cold-drawing benches. Tubes are frequently machined on both ends for various coupling systems and coated with organic material.

The importance of providing protection against corrosion for ferrous (e.g. iron or steel) long products used under harsh environmental conditions, e.g. outdoors, is well known. Coating a ferrous material (mainly steel) with zinc is a very effective and economical means for accomplishing this goal. Zinc coatings are commonly applied by dipping or passing the steel long product to be coated through a molten bath of the metal. This operation is termed "galvanizing", "hot galvanizing" or "hot-dip galvanizing" (HDG) to distinguish it from zinc electroplating processes. In this process, a solidified layer of zinc is formed on the product surface and the zinc coating layer formed as a result is strongly adhered to the surface of the article by an iron/zinc intermetallic alloy which forms during the galvanizing process. It is well known that oxides and other foreign materials ("soil") on the surface of the steel article interfere with the chemistry of the galvanizing process and prevent formation of a uniform, continuous, void-free coating. Accordingly, various techniques and combinations of techniques have been adopted in industry to reduce, eliminate, or at least accommodate, oxides and soil as much as possible.

Improvement in the properties of galvanized steel products can be achieved by alloying zinc with aluminum, and optionally magnesium. For instance addition of 5 wt. % aluminum produces an alloy with a lower melting temperature (eutectic point at 381° C.) which exhibits improved drainage properties relative to pure zinc. Moreover, galvanized coatings produced from this zinc-aluminum alloy (known as Galfan, subject to standard specifications such as ASTM B 750-99, ASTM A 856-98) have greater corrosion resistance, improved formability and better paintability in comparison to a conventional galvanized coating, i.e. formed from pure zinc. Galfan coatings advantageously combine the passive corrosion inhibition of aluminum oxidation with the active and passive effects of zinc. Galfan-coated wires may be drawn (subject to standard specification ASTM A 764) into spring wires, strands (standard specification ASTM A 855), chain link fences (standard specifications ASTM A 817-94 and ASTM A 824-95), gabions (standard specification ASTM A 974-97), and steel-reinforced aluminum conductors (standard specifications ASTM B 232-99 and ASTM B 401-99). Further advantages of Galfan coated wires, vis-à-vis conventional galvanized wire, have been evidenced for steel springs, including consistency of spring length (associated with a decreased frictional interaction with coiling tools), and good adherence of the Galfan coating to organic coatings. However, zinc-aluminum galvanizing is known to be particularly sensitive to surface cleanliness, so that various difficulties, such as insufficient steel surface wetting and the like, are often encountered when zinc-aluminum alloys are used in galvanizing.

Many techniques and combinations thereof have been adopted in industry to reduce, eliminate, or at least accommodate, oxides and soil as much as possible. In essentially all these processes, organic soil, that is, oil, grease, rust preventive compounds, is first removed by contacting the surface to be coated with an alkaline aqueous wash (alkaline cleaning). This may be accompanied by additional techniques such as brush scrubbing, ultrasound treatment and/or electro-cleaning, if desired. Then follows rinsing with water, contacting the surface with an acidic aqueous wash for removing iron fines and oxides (pickling), and finally rinsing with water again. All these cleaning-pickling-rinsing procedures are common for most galvanizing techniques and are industrially carried out more or less accurately.

Another pre-treatment method used for high strength steels, steels with high carbon contents, cast iron and cast steels is a mechanical cleaning method called blasting. In this method, rust and dirt are removed from the steel or iron surface by projecting small shots and grits onto this surface. Depending on the shape, size and thickness of the parts to be treated, different blasting machines are used such as a tumble blasting machine for bolts, a tunnel blasting machine for automotive parts, etc.

There are two main galvanizing techniques used on cleaned metal (e.g. iron or steel) parts: (1) the fluxing method, and (2) the annealing furnace method.

The first galvanizing technique, i.e. the fluxing method, may itself be divided into two categories, the dry fluxing method and the wet fluxing method.

The dry fluxing method, which may be used in combination with one or more of the above cleaning, pickling, rinsing or blasting procedures, creates a salt layer on the ferrous metal surface by dipping the metal part into an aqueous bath containing chloride salts, called a "pre-flux". Afterwards, this layer is dried prior to the galvanizing operation, thus protecting the steel surface from re-oxidation until its entrance in a molten zinc bath. Such pre-fluxes normally comprise aqueous zinc chloride and optionally contain ammonium chloride, the presence of which has been found to improve wettability of the article surface by molten zinc and thereby promote formation of a uniform, continuous, void-free coating.

The concept of wet fluxing is to cover the galvanizing bath with a top flux also typically comprising zinc chloride, and usually ammonium chloride, but in this case these salts are molten and are floating on the top of the galvanizing bath. The purpose of a top flux, like a pre-flux, is to supply zinc chloride and preferably ammonium chloride to the system to aid wettability during galvanizing. In this case, all surface oxides and soil which are left after cleaning-pickling-rinsing are removed when the steel part passes through the top flux layer and is dipped into the galvanizing kettle. Wet fluxing has several disadvantages such as, consuming much more zinc than dry fluxing, producing much more fumes, etc. Therefore, the majority of galvanizing plants today have switched their process to the dry fluxing method.

Below is a summary of the annealing furnace method. In continuous processes using zinc or zinc-aluminum or zinc-aluminum-magnesium alloys as the galvanizing medium, annealing is done under a reducing atmosphere such as a mixture of nitrogen and hydrogen gas. This not only eliminates re-oxidation of previously cleaned, pickled and rinsed surfaces but, also actually removes any residual surface oxides and soil that might still be present. The majority of steel coils are today galvanized according to this technology. A very important requirement is that the coil is leaving the annealing furnace by continuously going directly into the molten zinc without any contact with air. However this requirement makes it extremely difficult to use this technology for shaped parts, or for steel wire since wires break too often and the annealing furnace method does not allow discontinuity.

Another technique used for producing zinc-aluminum galvanized coatings comprises electro-coating the steel articles with a thin (i.e. 0.5-0.7 µm) layer of zinc (hereafter "pre-layer"), drying in a furnace with an air atmosphere and then dipping the pre-coated article into the galvanizing kettle. This is widely used for hot-dip coating of steel tubing in continuous lines and to a lesser extent for the production of steel strip. Although this does not require processing under reducing atmospheres, it is disadvantageous because an additional metal-coating step required.

Galvanizing is practiced either in batch operation or continuously. Continuous operation is suitably practiced on steel long products such as wires, tubes, rods and rails. In continuous operation, transfer of the articles between successive treatments steps is very fast and done continuously and automatically, with operating personnel being present to monitor operations and fix problems if they occur. Production volumes in continuous operations are high. In a continuous galvanizing line involving use of an aqueous pre-flux followed by drying in a furnace, the time elapsing between removal of the article from the pre-flux tank and dipping into the galvanizing bath is usually about 10 to 60 seconds instead of 10 to 60 minutes for a batch process.

There is a need to combine good formability with enhanced corrosion protection of the ferrous metal article. However, before a zinc-based alloy coating with high amounts of aluminum (and optionally magnesium) can be introduced into the general galvanizing industry, the following difficulties have to be overcome:

zinc alloys with high aluminum contents can hardly be produced using the standard zinc-ammonium chloride flux. Fluxes with metallic Cu or Bi deposits have been proposed earlier, but the possibility of copper or bismuth leaching into the zinc bath is not attractive. Thus, better fluxes are needed.

high-aluminum content alloys tend to form outbursts of zinc-iron intermetallic alloy which are detrimental at a later stage in the galvanization. This phenomenon leads to very thick, uncontrolled and rough coatings. Control of outbursts is absolutely essential.

wettability issues were previously reported in Zn—Al alloys with high-aluminum content, possibly due to a higher surface tension than pure zinc. Hence bare spots due to a poor wetting of steel are easily formed, and hence a need to lower the surface tension of the melt.

a poor control of coating thickness was reported. in Zn—Al alloys with high-aluminum content, possibly depending upon parameters such as temperature, flux composition, dipping time, steel quality, etc.

Thus a lot of technical problems remain to be solved in the steel galvanizing industry. Furthermore there are also problems which are specific to the galvanization of steel long products. Molten Galfan alloy is not compatible with most flux systems conventionally used in galvanizing. This limitation has led to wide usage of "double dipping" processes wherein the Galfan hot dip follows a conventional hot dip. For the proper galvanization of steel wires with a zinc-aluminum or zinc-aluminum-magnesium alloy, it is thus usually necessary to rely on the so-called double-dip technology, i.e. first dipping the steel long product into a zinc bath, and then dipping the zinc-coated steel wire into a second zinc-aluminum or zinc-aluminum-magnesium alloy bath. In this double dip processing the properly annealed, cleaned and fluxed steel acquires a galvanized coating in the first bath This coating will generally include a series of iron-zinc intermetallic compounds at the iron-zinc interface, together with an overlay that is nearly pure zinc. The series of iron-zinc intermetallic compounds can be a source of coating brittleness. When the galvanized steel long product enters the second bath containing molten Galfan, the bath temperature will generally be high enough to melt or dissolve the essentially zinc galvanized overlay and transform the iron-zinc intermetallic layer into an aluminum-iron-zinc intermetallic. Upon emergence from the Galfan bath a layer of essentially Galfan alloy solidifies on top of the transformed aluminum-iron-zinc intermetallic layer. Aluminum that enters into the aluminum-iron-zinc intermetallic. layer inherently lowers the aluminum concentration in the second bath. Thus double dip processing requires precise monitoring and management of the aluminum concentration.

Such a double dip processing appears for instance in EP 1.158.069 disclosing a plated steel wire wherein the average composition of the plating alloy used in the second stage contains 4-20 wt. % Al, 0.8-5 wt. % Mg and the balance Zn, and wherein an Fe—Zn alloy layer of no greater than 20 μm thickness is present at the plating—base metal interface. Such wire coating double dip procedure suffers from many technical and economical disadvantages as follows:

the need to invest into two separate zinc-based baths,
a higher energetic consumption than with a single bath procedure since wires need to be heated twice, and be quickly cooled down in between the two process stages,
the difficulty and extra cost to maintain the aluminum content (and optionally the magnesium content) constant in the second zinc-based bath, as reported for instance by Frank Goodwin and Roger Wright in *The process metallurgy of zinc-coated steel wire and Galfan bath management* jointly published by International Lead Zinc Research Organization Inc (North Carolina, U.S.A) and Rensselaer Polytechnic Institute (Troy, N.Y., U.S.A).
a higher residence time of wires at high temperature than with a single bath procedure and consequently a higher loss of mechanical resistance (tensile strength).

WO 03/057940 discloses a process for the preparation of a steel surface for hot-dip galvanizing in an aluminum-rich zinc-based (e.g. Galfan) molten bath, comprising the steps consisting of electrocleaning, ultrasonic cleaning or mechanical brush cleaning the surface, pickling the surface, and applying a protective layer to the surface by immersion in a flux solution, characterized in that cleaning is performed so as to obtain less than 0.6 μg/cm$^2$ residual dirt, and the flux solution comprises a soluble bismuth compound. Although a bismuth-containing flux composition may provide good Galfan coating at speeds which are compatible with a continuous production line for the galvanization of wires, it also suffers significant disadvantages such as very restrictive conditions of the previous cleaning or pickling steps. WO 03/057940 also teaches that coating quality significantly decreases when the aluminum content in the zinc-based galvanization bath increases, and further experiments have shown that this technology becomes hardly practicable when the aluminum content in the zinc-based galvanization bath exceeds 5 wt. % and/or when the zinc-based galvanization bath further includes magnesium.

It is known in the art that the addition of magnesium to an aluminum-rich zinc-based galvanization bath enhances the corrosion resistance, especially in a saline environment, and that this beneficial effect is greater when the magnesium concentration increases. However it is also known in the art that magnesium addition in a zinc alloy bath may decrease the cracking resistance of the coating being formed. The main factor for this phenomenon appears to be the formation of an intermetallic compound $MgZn_2$, the cracking resistance of which is low under the influence of mechanical stress. Furthermore magnesium addition in a zinc alloy bath leads to the formation of a relatively rough coating microstructure. Stress repartition within the coating being formed is consequently less homogeneous, and more important stress may appear at the interface of the different metallic phases constituting the coating. Thus, not only magnesium addition improves corrosion resistance at the expense of some manufacturing problems and of the coating quality, but also it tends to increase the formation of soil or dross which float at the surface of the zinc bath, as evidenced for instance in FIG. 1 of European patent No. 1.158.069.

WO 2011/009999 solves the above problems of magnesium addition by providing a coated long product, in particular a steel wire, by dipping it into a zinc alloy bath including 4-8 wt. % aluminum and 0.2-0.7 wt. % magnesium and, upon exit from said bath, cooling the coated product, wherein said cooling is controlled to impart to said metal coating a homogeneous microstructure having more than 25% by volume of a beta phase portion being responsible for a good ductility of the coating layer.

WO 02/42512 describes a flux for hot dip galvanization comprising 60-80 wt. % zinc chloride; 7-20 wt. % ammonium chloride; 2-20 wt. % of at least one alkali or alkaline earth metal salt; 0.1-5 wt. % of a least one of $NiCl_2$, $CoCl_2$ and $MnCl_2$; and 0.1-1.5 wt. % of at least one of $PbCl_2$, $SnCl_2$, $SbCl_3$ and $BiCl_3$. Preferably this flux comprises 6 wt. % NaCl and 2 wt. % KCl. Examples 1-3 teach flux compositions comprising 0.7-1 wt % lead chloride.

WO 2007/146161 describes a method of galvanizing with a molten zinc-alloy comprising the steps of (1) immersing a ferrous material to be coated in a flux bath in an independent vessel thereby creating a flux coated ferrous material, and (2) thereafter immersing the flux coated ferrous material in a molten zinc-aluminum alloy bath in a separate vessel to be coated with a zinc-aluminum alloy layer, wherein the molten zinc-aluminum alloy comprises 10-40 wt. % aluminum, at least 0.2 wt. % silicon, and the balance being zinc and optionally comprising one or more additional elements selected from the group consisting of magnesium and a rare earth element. In step (1), the flux bath may comprise from 10-40 wt. % zinc chloride, 1-15 wt. % ammonium chloride, 1-15 wt. % of an alkali metal chloride, a surfactant and an acidic component such that the flux has a final pH of 1.5 or less. In another embodiment of step (1), the flux bath may be as defined in WO 02/42512.

JP 2001/049414 describes producing a hot-dip Zn—Mg—Al base alloy coated steel sheet excellent in corrosion resistance by hot-dipping in a flux containing 61-80 wt. % zinc chloride, 5-20 wt. % ammonium chloride, 5-15 wt. % of one or more chloride, fluoride or silicafluoride of alkali or an alkaline earth metal, and 0.01-5 wt. % of one or more chlorides of Sn, Pb, In, Tl, Sb or Bi. More specifically, table 1 of JP 2001/049414 discloses various flux compositions with a KCl/NaCl weight ratio ranging from 0.38 to 0.60 which, when applied to a steel sheet in a molten alloy bath comprising 0.05-7 wt. % Mg, 0.01-20 wt. % Al and the balance being zinc, provide a good plating ability, no pin hole, no dross, and flat. By contrast, table 1 of JP 2001/049414 discloses a flux composition with a KCl/NaCl weight ratio of 1.0 which, when applied to a steel sheet in a molten alloy bath comprising 1 wt. % Mg, 5 wt. % Al and the balance being zinc, provides a poor plating ability, pin hole defect, some dross, and poorly flat.

Chinese patent application No. 101948990 teaches an electrolytic flux for hot dip galvanization of a steel wire, comprising g/L 30-220 g/L zinc chloride, 2-90 g/L ammonium chloride, 0-150 g/L potassium chloride, 0-150 g/L sodium chloride, 0-100 g/L boric acid, 0-70 g/L acetic acid, 1-25 g/L sodium fluoride, 2-50 g/L cerium chloride, 0-50 g/L potassium fluozirconate, 0-50 methanol, 0.5-20 g/L hydrogen peroxide, and the balance water. Hydrogen peroxide is used as an oxidant and, since the pH value is kept in a range of 4-5.5 by means of boric and acetic acids as buffer agents, $Fe(OH)_3$ is precipitated from the solution, eliminating the undesirable influence of $Fe^{2+}$ on the electrolytic flux. All exemplary embodiments of CN101948990 include fluoride salts and volatile organics which are banned by legislation (safety, toxicity) from industrial galvanization units.

Although the methods described in the above documents have brought some improvements over the previous state of the art, they have still not resolved most of the technical problems outlined hereinbefore, especially the numerous problems associated with the double dipping processing, with respect to the galvanization of steel long products such as, but not limited to, wires, rods, bars, rails, tubes, structural shapes and the like.

Consequently there is still a need in the art for improving continuous processing conditions vis-à-vis the current double dip technique of galvanizing wires, as well as fluxing compositions used therefore.

SUMMARY OF THE INVENTION

The object of the present invention is to provide an economically and technically improved method or process for the galvanization of steel long products such as, but not limited to, wires, bars, rods, rails, tubes and the like. It has been surprisingly found that, by first fluxing a steel long product with novel specific flux compositions, it is possible to continuously produce, more uniform, smoother and void-free galvanized coatings on such steel long products in a single hot dip galvanization step making use of zinc alloys, in particular zinc-aluminum alloys and zinc-aluminum-magnesium alloys of any suitable composition. More specifically it has surprisingly been found that this object can be achieved by providing potassium and sodium chlorides in a KCl/NaCl weight ratio of at least 2.0 in a flux composition comprising (a) more than 40 and less than 70 wt. % zinc chloride, (b) from 10-30 wt. % ammonium chloride, (c) more than 6 and less than 30 wt. % of a set of at least two alkali metal chlorides. The accurate selection of such fluxing compositions provide the unexpected advantage of avoiding, during the galvanization step, the need for a double dip processing sequentially using two different zinc baths, and consequently avoiding the cumbersome aluminum (and optionally magnesium) concentration management required by the current technique. The hereinabove stated technical and economical problems associated with double dip processing, or with the bismuth-containing fluxing compositions of WO 03/057940, are thus solved by the continuous process defined in claim 1 and, more specific embodiments defined in claims 2-17, and by the galvanized steel long product defined in claims 18-20.

DETAILED DESCRIPTION OF THE INVENTION

As defined in claim 1, the essential feature of this invention is the recognition that huge improvements in the galvanization of steel long products can be achieved when, after one or more treatment steps selected from alkaline cleaning, rinsing, pickling and drying, the further fluxing step starts from a flux composition comprising a set of at least two alkali metal chlorides including potassium and sodium chlorides in a KCl/NaCl weight ratio from 2.0 to 8.0. In anyone embodiment of this invention, the KCl/NaCl weight ratio may for instance be from 3.5 to 5.0, or from 3.0 to 6.0. This feature is associated with specific amounts of the other flux components.

Definitions

The term "hot dip galvanization" is meant to designate the corrosion treatment of a metal article such as, but not limited to, a steel product by dipping into a molten bath of an aluminum-rich zinc-based alloy, in continuous operation, for a sufficient period of time to create an effective protective layer at the surface of said long product.

The term "long product" is as meant in the Background of the Invention, both generally and including the specific embodiments listed therein.

In the following the different percentages relate to the proportion by weight of each component with respect to the total weight (100%) of the flux composition. This implies that not all maximum or not all minimum percentages can be present at the same time, in order for their sum to match to 100% by weight.

In one embodiment of this invention, the specified KCl/NaCl weight ratio is associated with the presence of lead chloride in the flux composition. The proportion of lead chloride may be at least 0.1 wt. %, or at least 0.4 wt. % or at least 0.7 wt. % of the flux composition. In another embodiment of this invention, the proportion of lead chloride in the flux composition may be at most 2 wt. %, or at most 1.5 wt. % or at most 1.2 wt. %. In a specific embodiment of this invention, the proportion of lead chloride in the flux composition is from 0.8 to 1.1 wt. %.

In one embodiment of this invention, the specified KCl/NaCl weight ratio is associated with the presence of tin chloride in the flux composition. The proportion of tin chloride in the flux composition may be at least 2 wt. % or at least 3.5 wt. % or at least 7 wt. %. In another embodiment of this invention, the proportion of tin chloride in the flux composition is at most 14 wt. %.

In one embodiment, the combined amounts of lead chloride and tin chloride represent at least 2.5 wt. %, or at most 14 wt. % of the flux composition. In another embodiment, the flux composition may further comprise other salts of lead and/or tin, such as the fluoride, or other chemicals that are inevitable impurities present in commercial sources of lead chloride and/or tin chloride.

In one aspect of this invention, the specified KCl/NaCl weight ratio is combined with specified proportions of other chlorides that make it possible to produce continuous, more uniform, smoother and void-free coatings on steel long products by a single hot dip galvanization continuous process with a molten aluminum-rich zinc-based alloy.

For instance, the specified KCl/NaCl weight ratio in the flux composition is combined with more than 40 and less than 70 wt. % zinc chloride. In one embodiment of this invention, the proportion of zinc chloride in the flux composition is at least 45 wt. % or at least 50 wt. %. In another embodiment, the proportion of zinc chloride in the flux composition is at most 65 wt. % or at most 62 wt. %. These selected proportions of $ZnCl_2$ are capable, in combination with the specified KCl/NaCl weight ratio in the flux composition, to ensure a good coating of the metal article to be galvanized and to effectively prevent oxidation of the metal article during subsequent process steps such as drying, i.e. prior to galvanization itself.

In one aspect of this invention, the specified KCl/NaCl weight ratio in the flux composition is combined with 10-30 wt. % ammonium chloride. In one embodiment, the proportion of NH$_4$Cl in the flux composition is at least 13 wt. % or at least 17 wt. %. In another embodiment, the proportion of ammonium chloride in the flux composition is at most 26 wt. % or at most 22 wt. %. The optimum proportion of NH$_4$Cl may be determined by the skilled person, without extensive experimentation and depending upon parameters such as the metal to be galvanized and the weight proportions of the metal chlorides in the flux composition, by simply using the experimental evidence shown in the following examples, to achieve a sufficient etching effect during hot dipping to remove residual rust or poorly pickled spots, while however avoiding the formation of black spots, i.e. uncoated areas of the metal article. In some circumstances it may be useful to substitute a minor part (e.g. less than ⅓ by weight) of NH$_4$Cl with one or more alkyl quaternary ammonium salt(s) wherein at least one alkyl group has from 8 to 18 carbon atoms such as described in EP 0488.423, for instance an alkyl-trimethylammonium chloride (e.g. trimethyllauryl-ammonium chloride) or a dialkyldimethylammonium chloride.

In one aspect of this invention, the specified KCl/NaCl weight ratio in the flux composition is further combined with the presence of suitable amounts of alkali or alkaline earth metal halides, in particular optional halides from alkali or alkaline earth metals other than K and Na. These halides are preferably or predominantly chlorides (bromides and iodides may be useful as well), and the other alkali or alkaline earth metals may be selected (sorted in decreasing order of preference in each metal class) from the group consisting of Li, Cs, Mg, Ca, Sr and Ba. Preferably, fluorides should be avoided for safety and/or toxicity reasons, i.e. the flux compositions should be fluoride salts-free. In one embodiment, the set of at least two alkali metal chlorides, optionally together with halides from alkali or alkaline earth metals other than K and Na, represents 6-30 wt. % of the flux composition. In another embodiment, the set of at least two alkali metal chlorides includes sodium chloride and potassium chloride as major or only components. In another embodiment, the set of at least two alkali metal chlorides (e.g. including sodium chloride and potassium chloride as major or only components) represents at least 12 wt. % or at least 15 wt. % of the flux composition. In another embodiment, the set of at least two alkali metal chlorides (e.g. including sodium chloride and potassium chloride as or only major components) represents at most 25 wt. %, or at most 21 wt. %, of the flux composition. NaBr, KBr, MgCl$_2$ and/or CaCl$_2$ may be present as minor components in each of the above stated embodiments.

In one aspect of this invention, the specified KCl/NaCl weight ratio in the flux composition is further combined with suitable amounts of one or more other metal (e.g. transition metal or rare earth metal) chlorides such as, but not limited to, nickel chloride, cobalt chloride, manganese chloride, cerium chloride and lanthanum chloride. For instance, the presence of up to 1 wt. % (even up to 1.5 wt. %) nickel chloride is not detrimental in terms of quality of the coating obtained after hot single-dip galvanization. Other metal chlorides that may be present include antimony chloride. Preferably the flux composition does not include a bismuth compound.

In other aspects of this invention, the specified respective KCl/NaCl weight ratio in the flux composition is further combined with the presence of other additives, preferably functional additives participating in tuning or improving some desirable properties of the flux composition for performing the fluxing step in the continuous single dip galvanization process of the invention. Such additives are presented below.

For instance the flux composition of this invention may further comprise at least one non-ionic surfactant or wetting agent which, when combined with the other ingredients, is capable of achieving a predetermined desirable surface tension. Essentially any type of nonionic surfactant, but preferably liquid water-soluble, can be used. Examples thereof include ethoxylated alcohols such as nonyl phenol ethoxylate, alkyl phenols such as Triton X-102 and Triton N101 (e.g. from Union Carbide), block copolymers of ethylene oxide and propylene oxide such as L-44 (from BASF), and tertiary amine ethoxylates derived from coconut, soybean, oleic or tallow oils (e.g. Ethomeen from AKZO NOBEL), polyethoxylated and polypropoxylated derivatives of alkylphenols, fatty alcohols, fatty acids, aliphatic amines or amides containing at least 12 carbon atoms in the molecule, alkylarene-sulfonates and dialkylsulfosuccinates, such as polyglycol ether derivatives of aliphatic and cycloaliphatic alcohols, saturated and unsaturated fatty acids and alkylphenols, said derivatives preferably containing 3-10 glycol ether groups and 8-20 carbon atoms in the (aliphatic) hydrocarbon moiety and 6-18 carbon atoms in the alkyl moiety of the alkylphenol, water-soluble adducts of polyethylene oxide with polypropylene glycol, ethylenediaminopolypropylene glycol containing 1-10 carbon atoms in the alkyl chain, which adducts contain 20-250 ethyleneglycol ether groups and/or 10-100 propyleneglycol ether groups, and mixtures thereof. Such compounds usually contain from 1-5 ethyleneglycol (EO) units per propyleneglycol unit. Representative examples are nonylphenol-polyethoxyethanol, castor oil polyglycolic ethers, polypropylene-polyethylene oxide adducts, tributyl-phenoxypolyethoxy-ethanol, polyethylene-glycol and octylphenoxypolyethoxyethanol. Fatty acid esters of polyethylene sorbitan (such as polyoxyethylene sorbitan trioleate), glycerol, sorbitan, sucrose and pentaerythritol, and mixtures thereof, are also suitable non-ionic surfactants. Low foaming wetting agents such as the ternary mixtures described in U.S. Pat. No. 7,560,494 are also suitable. Commercially available non-ionic surfactants of the above-mentioned types include those marketed by Zschimmer & Schwarz GmbH & Co KG (Lahnstein, Germany) under the trade names OXETAL, ZUSOLAT and PROPETAL, and those marketed by Alfa Kimya (Istanbul, Turkey) under the trade name NETZER SB II. Various grades of suitable non-ionic surfactants are available under the trade name MERPOL.

The hydrophilic-lipophilic balance (HLB) of said at least one nonionic surfactant is not a critical parameter of this invention and may be selected by the skilled person within a wide range from 3 to 18, for instance from 6 to 16. E.g. the HLB of MERPOL-A is 6 to 7, the HLB of MERPOL-SE is 11, and the HLB of MERPOL-HCS is 15. Another feature of the nonionic surfactant is its cloud point (i.e. the temperature of phase separation as may me determined e.g. by ASTM D2024-09 standard test method; this behavior is characteristic of non-ionic surfactants containing polyoxyethylene chains, which exhibit reverse solubility versus temperature in water and therefore "cloud out" at some point as the temperature is raised; glycols demonstrating this behavior are known as "cloud-point glycols") which should preferably be higher than the flux working temperature as defined below with respect to the use of a fluxing bath in a hot dip galvanization process. Preferably the cloud point of the nonionic surfactant should be higher than 90° C.

Suitable amounts of non-ionic surfactants are well known from the skilled person and usually range from 0.02 to 2.0 wt. %, preferably from 0.5 to 1.0 wt. %, of the flux composition, depending upon the selected type of compound.

The flux compositions of the invention used in the fluxing step may further comprise at least one corrosion inhibitor, i.e. a compound inhibiting the oxidation of steel particularly in oxidative or acidic conditions. In one embodiment, the corrosion inhibitor includes at least an amino group. Inclusion of such amino derivative corrosion inhibitors in the flux compositions can significantly reduce the rate of iron accumulation in the flux tank. By "amino derivative corrosion inhibitor" is meant herein a compound which inhibits the oxidation of steel and contains an amino group. Aliphatic alkyl amines and quaternary ammonium salts (preferably containing 4 independently selected alkyl groups with 1-12 carbon atoms) such as alkyl dimethyl quaternary ammonium nitrate are suitable examples of this type of amino compounds. Other suitable examples include hexamethylenediamines. In another embodiment, the corrosion inhibitor includes at least one hydroxyl group, or both a hydroxyl group and an amino group and are well known to those skilled in the art. Suitable amounts of the corrosion inhibitor are well known from the skilled person and usually range from 0.02 to 2.0 wt. %, preferably 0.1-1.5 wt. %, or 0.2-1.0 wt. %, depending upon the selected type of compound. The flux compositions of the invention may comprise both at least one corrosion inhibitor and a nonionic surfactant or wetting agent as defined hereinabove.

In anyone of the above embodiments, the flux compositions of the invention are preferably free from volatile organics, e.g. acetic acid, boric acid and methanol, especially those banned from galvanization units by legislation (safety, toxicity).

The flux compositions of the invention may be produced by various methods. They can simply be produced by mixing, preferably thoroughly (e.g. under high shear), the essential components (i.e. zinc chloride, ammonium chloride, alkali metal chlorides) and, if need be, the optional ingredients (i.e. lead chloride, tin chloride, alkyl quaternary ammonium salt(s), other transition or rare earth metal chlorides, other alkali or alkaline earth metal halides, corrosion inhibitor(s) and/or nonionic surfactant(s)) in any possible order in one or more mixing steps. When lead chloride is present, the flux compositions used in the fluxing step of the invention may also be produced by a sequence of at least two steps, wherein one step comprises the dissolution of lead chloride in ammonium chloride or sodium chloride or a mixture thereof, and wherein in a further step the solution of lead chloride in ammonium chloride or sodium chloride or a mixture thereof is then mixed with the other essential components (i.e. zinc chloride, potassium chloride) and, if need be, the optional ingredients (as listed above) of the composition. In one embodiment of the latter method, dissolution of lead chloride is carried out in the presence of water. In another embodiment of the latter method, it is useful to dissolve an amount ranging from 8 to 35 g/l lead chloride in an aqueous mixture comprising from 150 to 450 g/l ammonium chloride and/or or sodium chloride and the balance being water. In particular the latter dissolution step may be performed at a temperature ranging from 55° C. to 75° C. for a period of time ranging from 4 to 30 minutes and preferably with stirring.

For use in the fluxing step of the process of this invention, a flux composition according to any one of the above embodiments is preferably dissolved in water or an aqueous medium. Methods for water-dissolving a flux composition based on zinc chloride, ammonium chloride, alkali metal chlorides and optionally one or more chlorides of a transition or rare earth metal (e.g. lead, tin, nickel, cobalt, cerium, lanthanum) are well known in the art. The total concentration of components of the flux composition in the fluxing bath may range within very wide limits such as 200-750 g/l, preferably 350-750 g/l, most preferably 500-750 g/l or 600-750 g/l.

This fluxing bath, which is particularly adapted for the single dip continuous galvanizing process of the invention, should advantageously be maintained at a temperature within a range of 50° C.-90° C., preferably 60° C.-90° C., most preferably 65° C.-85° C. throughout the fluxing step. The fluxing step is preferably performed for a period of time (i.e. the average residence time of the steel long product in the fluxing bath) ranging from about 1 to 10 seconds. As is well known to the skilled person, this period of time may widely vary from one long product to the other, depending upon operating parameters such as, but not limited to, the composition of the fluxing bath, the composition of the metal (e.g. a low carbon or a high carbon steel, and the presence and amount of metals other than iron), the shape and/or size of the long product, and the temperature of the fluxing bath. As a general rule, shorter times (e.g. from 1 to 6 seconds) are suitable for wires, whereas longer times (closer to 10 seconds) are more suitable for instance for rods. Taking into account that the steel long product is usually moved along the continuous production line, this kinetic parameter can also be expressed in terms of a dipping speed from about 0.5 to 10 m/minute, preferably from 1 to 5 m/minute. Much higher speeds of 10-100 m/min, e.g. 20-60 m/min, can also be achieved.

Practically, any metal long product susceptible to corrosion, e.g. any type of iron or steel long product may be treated in this way. The shape, geometry or size of the metal long product are not critical parameters of the present invention.

It is important for the success of the whole galvanization process that the surface of the steel long product be suitably cleaned before the fluxing step. Techniques for achieving a desirable degree of surface cleanliness are well known in the art. Different standards have been set forth regarding the desirable degree of cleanliness, such as the maximal level of residual dirt of 0.6 µg/cm$^2$ described in WO 03/057940. Conventional cleaning techniques include alkaline cleaning, rinsing, pickling with a strong acid, and drying, but are not limited thereto. For instance EP-A-2,281,912 discloses cleaning the surface of a wire by passing it through a bath containing a phosphoric acid aqueous solution whereby said wire is cleaned by ultrasounds, followed by a vacuum drying stage. Although all these procedures are well known, the following description is presented for the purpose of completeness.

Continuous alkaline cleaning can conveniently be carried out with an aqueous alkaline composition (e.g. a sodium or potassium hydroxide aqueous solution) also containing one or more phosphates (e.g. sodium poly-phosphate), carbonates (e.g. sodium carbonate) or silicates as builders as well as one or more various surfactant(s). The free alkalinity of such aqueous cleaners can vary broadly depending upon parameters such as the type and concentration of alkali hydroxide and alkali salts. The efficiency of the continuous alkaline cleaning step depends upon parameters such as the temperature at which and the duration for which degreasing is carried out. According to a series of experiments, it has been found that the temperature during the continuous alkaline degreasing step may suitably range from about 40° C. to 65° C., for instance about 60° C. It has been found that the duration of the continuous alkaline degreasing step, i.e. the average period of time wherein the steel long product passes through the degreasing bath, may suitably range from about 1 to 60 seconds, or up to 30 seconds, for instance about 10 seconds, depending upon the degreasing temperature. Thus at an initial process step, the steel long product is submitted to cleaning (degreasing) in a degreasing bath. The latter may advantageously be assisted by an ultrasound generator provided in the alkali degreasing bath.

Then the steel long product is preferably rinsed. At a further step the steel long product is submitted to a continuous pickling treatment and then preferably rinsed. For instance the steel long product is continuously pickled by immersion into a bath of an aqueous strongly acidic medium, e.g. a water-soluble inorganic acid such as hydrochloric acid, sulfuric acid, hydrofluoric acid, phosphoric acid, nitric acid and mixtures thereof in any suitable proportions. As is well known to the skilled person, the choice of the primary acid used for pickling depends upon parameters such as the speed at which continuous pickling is desired and the type of steel, in particular the alloy content in carbon steel, from which the long product is made. The continuous pickling step is usually performed at a temperature ranging from about 15° C. to 60° C., for instance 20° C., 25° C. or 40° C. Acid concentrations, e.g. hydrochloric acid concentrations, of about 5 wt. % to 20 wt. %, e.g. 12 wt. % to 18 wt. %, are normally used, although more concentrated acids are possible, depending upon the selected inorganic acid. The duration of the continuous pickling step, i.e. the average period of time wherein the steel long product passes through the pickling bath, typically ranges from about 3 to 30 seconds, more typically from 5 to 15 seconds, depending upon the acid and the temperature being used. Higher pickling times up to about 5 minutes may also be used.

In order to prevent over-pickling, it is also conventional to include in the pickling liquid one or more corrosion inhibitor(s) such as defined herein-above, typically a cationic or amphoteric surface active agent. Typically, such one or more corrosion inhibitors may be present in the pickling bath in amounts ranging from 0.02 to 1.0 wt. %, for instance 0.05-0.5 wt. %, depending upon the type of corrosion inhibitor. The pickling bath may further include one or more halides, e.g. ferric chloride, ammonium fluoride and the like.

Pickling can be accomplished simply by dipping and moving the steel long product into a pickling tank containing the pickling bath. Additional processing steps can also be used. For example, the steel long product can be continuously or intermittently agitated either mechanically or ultrasonically, and/or an electric current can be passed through it for electro-pickling. The steel long product can also be submitted to a blasting step, for instance between alkaline degreasing and pickling, e.g. in a tumble blasting machine. These additional processing means usually shorten the pickling time significantly. It is clear that these pre-treatment steps may be repeated individually or by cycle if needed until the desirable degree of cleanliness is achieved.

Then shortly, preferably immediately, after the cleaning steps, the metal (e.g. steel) article is treated with, e.g. immersed into, a fluxing bath comprising a fluxing composition with a KCl/NaCl ratio according to this invention in order to form an efficient and defect-free protective film on its surface as described hereinbefore.

The fluxed steel long product, i.e. after immersion into the fluxing bath during the appropriate period of time and at the suitable temperature, is preferably subsequently dried. Drying may be carried out by continuously passing the fluxed steel long product through a furnace having an air atmosphere, for instance a forced air stream, where it is heated at an air dryer temperature from about 220° C. to 300° C. until the long product surface exhibits a temperature ranging between 170° C. and 200° C., e.g. for a period of time ranging from about 1 to 3 minutes. However It has also been surprisingly found that milder heating conditions may be more appropriate when a fluxing composition, including any particular embodiment thereof, is used in the fluxing step of the present invention. Thus it may be sufficient for the surface of the steel long product to exhibit a temperature from 100° C. to 160° C., or 120° C.-150° C. during the continuous drying step. This can be achieved for instance by performing the drying step by using an induction heating system or an infrared heating system, or a combination of both. In this embodiment of the process, the heating temperature may range from 100° C. to 200° C., for instance from 110° C. to 160° C. This can also be achieved by using a poorly oxidative atmosphere during the continuous drying step. In another embodiment, depending upon the selected drying temperature, drying may be continuously effected for a period of time ranging from about 3 to 10 minutes. In another embodiment, continuous drying may be effected in specific gas atmospheres such as, but not limited to a water-depleted air atmosphere, a water-depleted nitrogen atmosphere, or a water-depleted nitrogen-enriched air atmosphere (e.g. wherein the nitrogen content is above 20%).

At the next step of the continuous galvanization process, the fluxed and dried steel long product is submitted to a single dipping step into a molten aluminum-rich zinc-based galvanizing bath to form a protective coating thereon. As is well known, the dipping time of this single dipping step may be suitably defined depending upon a set of parameters including, but not restricted to, the size and shape of the article, the desired coating thickness, the type of steel (low carbon or high carbon content) and the exact composition of the zinc-based galvanization bath, in particular its aluminum content (when a Zn—Al alloy is used as the galvanizing bath) or magnesium content (when a Zn—Al—Mg alloy is used as the galvanizing bath). In an embodiment, the molten aluminum-rich zinc-based galvanizing bath may comprise (a) from 4 to 24 wt % (e.g. 5 to 20 wt. %) aluminum, (b) from 0 to 6 wt. % (e.g. 1 to 4 wt. %) magnesium, and (c) the rest being essentially zinc. In another embodiment of the present invention, the molten aluminum-rich zinc-based galvanizing bath may comprise from 0.5 to 1% by weight magnesium. In another embodiment of the present invention, the molten aluminum-rich zinc-based galvanizing bath may comprise tiny amounts (i.e. below 1.0 weight %) or trace amounts (i.e. unavoidable impurities) of other elements such as, but not limited to, silicium, tin, lead, titanium or vanadium. In another embodiment, the molten aluminum-rich zinc-based galvanizing bath may be continuously or intermittently agitated during this treatment step. During this process step, the zinc-based galvanizing bath is preferably maintained at a temperature ranging from 360° C. to 600° C. It has been surprisingly found that with a flux composition used in the fluxing step of the process of the present invention it is possible to lower the temperature of the dipping step whilst obtaining thin protective coating layers of a good quality, i.e. defect-free and deemed to be capable of maintaining their protective effect for an extended period of time such as five years or more, or even 10 years or more, depending upon the type of environmental conditions (air humidity, temperature, pH, and so on). Thus in one embodiment of the invention, the molten zinc-based galvanizing bath is kept at a temperature ranging from 350° C. to 550° C., e.g. 380° C.-520° C. or 420° C.-530° C., the optimum temperature depending upon the content of aluminum and optionally magnesium present in the zinc-based bath.

In one embodiment, the thickness of the protective coating layer obtained by carrying out the continuous single dipping step on the steel long product of this invention may range from about 5 to 50 μm, for instance from 8 to 30 μm. This can be appropriately selected by the skilled person, depending upon a set of parameters including the thickness and/or shape of the steel long product, the stress and environmental conditions which it is supposed to withstand, the expected durability in time of the protective coating layer formed, etc. For instance a 5-15 μm thick coating layer is suitable for a steel long product being less than 1.5 mm thick, and a 20-35 μm thick coating layer is suitable for a steel long product being more than 6 mm thick.

Finally, the steel long product may be removed from the galvanizing bath and cooled down. This cooling step may conveniently be carried out either by dipping the galvanized metal article in water or simply by allowing it to cool down in air.

The present single dip galvanization process has been found to allow continuous deposition of thinner, more uniform, smoother and void-free protective coating layers on steel long products, especially when a zinc-aluminum or zinc-aluminum-magnesium galvanizing bath with not more than 95% zinc was used. Regarding roughness, the coating surface quality is equal to or better than that achieved with a conventional HDG zinc layer according to EN ISO 1461 (i.e. with not more than 2% other metals in the zinc bath). Regarding corrosion resistance, the coating layers of this invention achieve about 1,000 hours in the salt spray test of ISO 9227 which is much better than the about 600 hours achieved with a conventional HDG zinc layer according to EN ISO 1461.

Moreover the process of the present invention is well adapted to galvanize steel long products made from a large variety of steel grades, in particular, but not limited to, steel long products having a carbon content up to 0.25 wt. %, a phosphorous content between 0.005 and 0.1 wt. % and a silicon content between 0.0005 and 0.5 wt. %, as well as stainless steels. The classification of steel grades is well known to the skilled person, in particular through the Society of Automotive Engineers (SAE). In one embodiment, the metal may be a chromium/nickel or chromium/nickel/molybdenum steel susceptible to corrosion. Optionally the steel grade may contain other elements such as sulfur, aluminum, and copper. Suitable examples thereof include, but are not limited to, the steel grades known as AISI 304 (*1.4301), AISI 304L (1.4307, 1.4306), AISI 316 (1.4401), AISI 316L (1.4404, 1.4435), AISI316Ti (1.4571), or AISI 904L (1.4539) [*1.xxxx=according to DIN 10027-2]. In another embodiment of the present invention, the metal may be a steel grade referenced as S235JR (according EN 10025) or S460MC (according EN 10149-2) or a carbon steel grade known as 20MnB4 (*1.5525, according to EN 10263).

The following examples are given for understanding and illustrating the invention and should not be construed as limiting the scope of the invention, which is defined only by the appended claims.

Example 1

A 3 mm diameter wire made from a steel grade containing (by weight) 0.06% carbon, 0.03% sulfur, 0.6% manganese, 0.15% silicium, 0.02% phosphorus, 0.1% chromium, 0.25% copper was processed as follows.

First, alkaline degreasing was continuously performed for 10 seconds in a degreasing bath comprising 50 g/l of a salt mix marketed under the trade name Solvopol SOP by Lutter Galvanotechnik GmbH, and 1% by volume of a tenside blend marketed under the trade name Emulgator SEP by Lutter Galvanotechnik GmbH.

After rinsing the degreased wire was continuously passed through a pickling bath containing 120 g/l hydrochloric acid, 10 ml/l of a corrosion inhibitor PM from Lutter Galvanotechnik GmbH, and 10 ml/l of a tenside blend marketed under the trade name Emulgator DX by Lutter Galvanotechnik GmbH. This pickling step was carried out at 40° C. for 10 seconds.

After rinsing the degreased and pickled wire was continuously passed through a fluxing aqueous bath containing 550 g/l of a fluxing composition comprising (by weight) 60% zinc chloride, 20% ammonium chloride, 3% sodium chloride, 12% potassium chloride, 4% tin chloride and 1% lead chloride. This fluxing step was carried out at 72° C. for 6 seconds.

The fluxed wire was then dried until its surface reaches 120° C. Finally galvanization was performed with a zinc alloy containing 5% by weight aluminum and 1% by weight Mg. This galvanization step was carried out at 420° C. for 6 seconds.

Quality of the resulting protective coating layer was assessed visually by a panel of three persons evaluating the percentage of the wire surface that is perfectly coated by the aluminum-rich zinc alloy, i.e. free from defects such as pinholes and the like. The average note was 98%.

Example 2—General Procedure for Galvanization of a Steel Rod Grade HSA-F (C35)

A steel rod (thickness 8.0 mm) from a steel grade HSA-F (C35) (specifications by weight: 0.35-0.42% carbon, 0.15-0.35% silicium, 0.6-0.9% manganese, max. 0.03% phosphorus, max. 0.04% sulfur) is treated according the following procedure:

alkaline degreasing at 60° C. by means of SOLVOPOL SOP (50 g/l) and a tenside mixture Emulgator Staal (10 g/l), both commercially available from Lutter Galvanotechnik GmbH, for 30 minutes;

rinsing with water;

blasting in a tumble blasting machine during 30 minutes with an angular steel grit (type GL80) with a projection speed of 65 m/s;

pickling in a hydrochloric acid based bath (composition: 18 wt. % HCl, 10 ml/l of inhibitor PM and 10 ml/l Emulgator C75 both available from Lutter Galvanotechnik GmbH) at 25° C. for 5 minutes;

rinsing with water;

fluxing the steel rod at 80° C. in a flux composition (comprising 60 wt. % zinc chloride, 20 wt. % ammonium chloride, 3 wt. % sodium chloride, 12 wt. % potassium chloride, 4 wt. % tin chloride and 1 wt. % lead chloride) with a total salt concentration of 650 g/l and in the presence of 2 ml/l Netzer 4 (a wetting agent from Lutter Galvanotechnik GmbH), by using an extraction speed of 4 m/min;

drying until the steel rod surface temperature reaches 120° C.;

galvanizing the fluxed steel rod for 5 minutes at 530° C. with a dipping speed of 4 m/min in a zinc based bath comprising 20.0 wt. % aluminum, 4.0 wt. % magnesium, 0.2% silicium and trace amounts of lead, the balance being zinc; and cooling down the galvanized steel plate in air.

This procedure has been found to provide a superior coating quality similar to example 1. The following variants of this procedure also provide superior coating quality:

Idem but with 5 minutes blasting, with 8 minutes fluxing, and with galvanizing zinc bath at 510° C. during 5 or 10 minutes;

Idem but with 5 minutes blasting, with 8 minutes fluxing, and with galvanizing zinc bath at 530° C. during 5, 10 or 15 minutes.

Example 3—General Procedure for Galvanization of a Steel Rod Grade 20MnB4

A steel rod (thickness 12.4 mm) from a steel grade 20MnB4 (with the following contents by weight: 0.228% carbon, 0.197% silicium, 0.942% manganese, 0.011% phosphorus, 0.005% sulfur, 0.245% chromium, 0.036% nickel, 0.007% molybdenum, 0.038% aluminum and 0.057% copper) is treated according the following procedure:

first alkaline degreasing at 60° C. by means of SOL-VOPOL SOP (50 g/l) and a tenside mixture Emulgator Staal (10 g/l), both available from Lutter Galvanotechnik GmbH, for 60 minutes;

rinsing with water;

pickling in a hydrochloric acid based bath (composition: 18 wt % HCl, 10 g/l of fluorides from the salt NH4F.HF, 10 ml/l of inhibitor PM and 10 ml/l Emulgator C75 from Lutter Galvanotechnik GmbH) at 40° C. for 1 minute;

rinsing with water;

second alkaline degreasing at 60° C. for 5 minutes in a degreasing bath with the same chemical composition as in the first step;

rinsing with water;

cleaning in a solution with 100 g/l of Novaclean N and 2 ml/l of Rodine A31 (a liquid anti-corrosive additive for acids available from MAVOM, Schelle, Belgium), 10 ml/l of Netzer DX from Lutter Galvanotechnik GmbH, at room temperature for 1 minute;

fluxing the steel rod at 80° C. for 10 minutes in a flux composition comprising 60 wt. % zinc chloride, 20 wt. % ammonium chloride, 3 wt. % sodium chloride, 12 wt. % potassium chloride, 4 wt. % tin chloride and 1 wt. % lead chloride) with a total salt concentration of 650 g/l and in the presence of 2 ml/l Netzer 4 (a wetting agent from Lutter Galvanotechnik GmbH), by using an extraction speed of 4 m/min;

drying until the steel rod surface temperature reaches 120° C.;

galvanizing the fluxed steel rod for 10 minutes at 530° C. with a dipping speed of 4 m/min in a zinc based bath comprising 20.0 wt. % aluminum, 4.0 wt. % magnesium, 0.2 wt. % silicium and trace amounts of lead, the balance being zinc; and cooling down the galvanized steel plate in air.

This procedure has been found to provide a superior coating quality similar to example 1.

The invention claimed is:

1. A continuous galvanization process for a steel product selected from the group consisting of wires, rods, rails, structural shapes, bars, and tubes, the continuous galvanization process comprises one single galvanizing bath dipping step consisting of dipping the said steel product into a molten galvanizing bath comprising (a) from 4 to 24 wt. % aluminum, (b) from 0 to 6 wt. % magnesium, and (c) not more than 95 wt. % zinc, wherein prior to said single galvanizing bath dipping step the said steel product has been submitted to one or more treatment steps selected from the group consisting of alkaline cleaning, rinsing, pickling and drying, and subsequently a fluxing step consisting of dipping said steel product into a flux composition comprising (a) more than 40 wt. % and less than 70 wt. % zinc chloride, (b) 10 wt. % to 30 wt. % ammonium chloride, c) more than 6 wt. % and less than 30 wt. % of a set of at least two alkali metal chlorides including sodium chloride and potassium chloride, (d) from 0.1 wt % to 2 wt. % lead chloride, and (e) from 2 wt. % to 15 wt. % tin chloride, provided that the KCl/NaCl weight ratio of said set of at least two alkali metal chlorides ranges from 2.0 to 8.0; and wherein the combined amounts of lead chloride and tin chloride represent at least 2.5 wt. % of said flux composition.

2. The continuous galvanization process according to claim 1, wherein said flux composition further comprises at least one metal chloride selected from the group consisting of nickel chloride, cobalt chloride, manganese chloride, cerium chloride, antimony chloride and lanthanum chloride.

3. The continuous galvanization process according to claim 1, wherein said flux composition comprises up to 1.5 wt. % nickel chloride.

4. The continuous galvanization process according to claim 1, wherein said flux composition further comprises at least one non-ionic surfactant.

5. The continuous galvanization process according to claim 1, wherein said flux composition further comprises at least one corrosion inhibitor.

6. The continuous galvanization process according to claim 5, wherein said at least one corrosion inhibitor comprises at least one hydroxyl or amino group.

7. The continuous galvanization process according to claim 1, wherein said flux composition is fluoride salts-free.

8. The continuous galvanization process according to claim 1, wherein said flux composition is free from volatile organics.

9. The continuous galvanization process according to claim 1, wherein said flux composition is dissolved in water.

10. The continuous galvanization process according to claim 9, wherein the total concentration of components of the flux composition in water ranges from 200 to 750 g/L.

11. The continuous galvanization process according to claim 1, wherein said fluxing step is performed for a period of time ranging from 1 to 10 seconds.

12. The continuous galvanization process according to claim 1, wherein said fluxing step is performed at a temperature ranging from 70° C. to 90° C.

13. The continuous galvanization process according to claim 1, wherein said alkaline cleaning step is performed at a temperature ranging from 40° C. to 65° C. for a period of time ranging from 1 second to 30 minutes.

14. The continuous galvanization process according to claim 1, wherein said pickling step is performed at a temperature ranging from 15° C. to 60° C. for a period of time ranging from 3 seconds to 5 minutes.

15. The continuous galvanization process according to claim 1, wherein said drying step is performed by means of an induction heating system or an infrared heating system, or a combination of both, until the product surface reaches 100° C. to 150° C.

16. The continuous galvanization process according to claim 1, wherein the rest of the molten galvanizing bath is zinc.

17. The continuous galvanization process according to claim 1, wherein the flux composition comprises at least 3.5 wt % tin chloride.

18. A continuous galvanization process for a steel product selected from the group consisting of wires, rods, rails, structural shapes, bars, and tubes,
   the continuous galvanization process comprises one single galvanizing bath dipping step consisting of dipping the said steel product into a molten galvanizing bath comprising
   (a) from 4 to 24 wt. % aluminum,
   (b) from 0 to 6 wt. % magnesium, and
   (c) not more than 95 wt. % zinc,
   wherein prior to said single galvanizing bath dipping step the said steel product has been submitted to one or more treatment steps selected from the group consisting of alkaline cleaning, rinsing, pickling and drying,
   wherein said pickling step is performed at a temperature ranging from 15° C. to 60° C. for a period of time ranging from 3 seconds to 5 minutes, and
   subsequently a fluxing step consisting of dipping said steel product into a flux composition comprising
   (a) more than 40 wt. % and less than 70 wt. % zinc chloride,
   (b) 10 wt. % to 30 wt. % ammonium chloride,
   c) more than 6 wt. % and less than 30 wt. % of a set of at least two alkali metal chlorides including sodium chloride and potassium chloride,
   (d) from 0.1 wt % to 2 wt. % lead chloride, and
   (e) from 2 wt. % to 15 wt. % tin chloride,
   provided that the KCl/NaCl weight ratio of said set of at least two alkali metal chlorides ranges from 2.0 to 8.0; and
   wherein the combined amounts of lead chloride and tin chloride represent at least 2.5 wt. % of said flux composition.

19. A continuous galvanization process for a steel product selected from the group consisting of wires, rods, rails, structural shapes, bars, and tubes,
   the continuous galvanization process comprises one single galvanizing bath dipping step consisting of dipping the said steel product into a molten galvanizing bath comprising
   (a) from 4 to 24 wt. % aluminum,
   (b) from 0 to 6 wt. % magnesium, and
   (c) not more than 95 wt. % zinc,
   wherein prior to said single galvanizing bath dipping step the said steel product has been submitted to one or more treatment steps selected from the group consisting of alkaline cleaning, rinsing, pickling and drying, and
   subsequently a fluxing step consisting of dipping said steel product into a flux composition comprising
   (a) more than 40 wt. % and less than 70 wt. % zinc chloride,
   (b) 10 wt. % to 30 wt. % ammonium chloride,
   c) more than 6 wt. % and less than 30 wt. % of a set of at least two alkali metal chlorides including sodium chloride and potassium chloride,
   (d) from 0.1 wt % to 2 wt. % lead chloride, and
   (e) from 2 wt. % to 15 wt. % tin chloride,
   provided that the KCl/NaCl weight ratio of said set of at least two alkali metal chlorides ranges from 2.0 to 8.0;
   wherein the combined amounts of lead chloride and tin chloride represent at least 2.5 wt. % of said flux composition, and
   wherein said flux composition further comprises at least one non-ionic surfactant and at least one corrosion inhibitor having at least one hydroxyl or amino group.

20. A continuous galvanization process for a steel product selected from the group consisting of wires, rods, rails, structural shapes, bars, and tubes,
   the continuous galvanization process comprises one single galvanizing bath dipping step consisting of dipping the said steel product into a molten galvanizing bath comprising
   (a) from 4 to 24 wt. % aluminum,
   (b) from 0 to 6 wt. % magnesium, and
   (c) not more than 95 wt. % zinc,
   wherein prior to said single galvanizing bath dipping step the said steel product has been submitted to one or more treatment steps selected from the group consisting of alkaline cleaning, rinsing, pickling and drying, and
   subsequently a fluxing step consisting of dipping said steel product into a flux composition comprising
   (a) more than 40 wt. % and less than 70 wt. % zinc chloride,
   (b) 10 wt. % to 30 wt. % ammonium chloride,
   c) more than 6 wt. % and less than 30 wt. % of a set of at least two alkali metal chlorides including sodium chloride and potassium chloride,
   (d) from 0.1 wt % to 2 wt. % lead chloride, and
   (e) from 2 wt. % to 15 wt. % tin chloride,
   provided that the KCl/NaCl weight ratio of said set of at least two alkali metal chlorides ranges from 2.0 to 8.0;
   wherein the combined amounts of lead chloride and tin chloride represent at least 2.5 wt. % of said flux composition, and
   wherein the flux composition contains no fluoride salts.

\* \* \* \* \*